United States Patent [19]

Inoue et al.

[11] Patent Number: 4,850,510

[45] Date of Patent: Jul. 25, 1989

[54] BANKBOOK ISSUING APPARATUS

[75] Inventors: Masashi Inoue; Hiroshi Satoh, both of Seto; Hideo Tamamoto, Owariasahi, all of Japan

[73] Assignee: Hitachi, Ltd., Tokyo, Japan

[21] Appl. No.: 942,784

[22] Filed: Dec. 17, 1986

[30] Foreign Application Priority Data

Dec. 20, 1985 [JP] Japan ................................ 60-288194
Feb. 28, 1986 [JP] Japan ................................ 61-41764

[51] Int. Cl.[4] ........................ B65G 59/06; B65H 3/06; B65H 3/44

[52] U.S. Cl. .................................... 221/131; 221/259; 271/9; 271/119; 271/902

[58] Field of Search ........................ 221/34, 39, 42, 43, 221/129, 131, 259; 235/379; 271/9, 119, 902

[56] References Cited

U.S. PATENT DOCUMENTS 3,777,929 12/1973 Hannon et al. .................. 221/39 X
3,944,212 3/1976 Stange et al. .......................... 271/9
4,438,915 3/1984 Akamatsu et al. .............. 271/902 X
4,488,367 12/1984 Yamauchi et al. .............. 235/379 X
4,660,822 4/1987 Winkler et al. ................. 221/259 X

FOREIGN PATENT DOCUMENTS 162802 9/1905 Fed. Rep. of Germany ........ 221/39

*Primary Examiner*—F. J. Bartuska
*Attorney, Agent, or Firm*—Antonelli, Terry & Wands

[57] ABSTRACT

On a transport path starting from a bankbook outlet from which a customer picks up a bankbook and extending into the inside of the bankbook issuing apparatus, a plurality of store units are disposed one after another. Bankbooks of several different types are stacked in the store units each reserving those of a same type. Upon request from a customer or a host computer, one of the store units in which requested bankbooks are stacked is selected. A bankbook at the lowest position in the selected store unit is then drawn therefrom to be transported on the transport path back to the bankbook outlet and to the customer.

4 Claims, 12 Drawing Sheets

BANKBOOK ISSUING APPARATUS

BACKGROUND OF THE INVENTION

The present invention relates to an apparatus for issuing bankbooks or the like to be used by the financial industry, and more particularly to an apparatus for issuing bankbooks or the like provided with a drawing-out mechanism suitable for use in smoothly drawing a single bankbook or the like of a desired type from those of several different types, which are reserved on a shelf having a plurality of store units such that bankbooks or the like of a same type are stacked on the store unit.

The apparatus of this type is known as disclosed, for example, in the Official Gazette of JP-A-57-193864, JP-A-57-83885, JP-A-57-31092, or JP-A-58-207190, in which bankbooks or the like of the same type are reserved on a shelf. However, still not known is an apparatus which has a function of selecting one of several types of bankbooks or the like reserved on a shelf and drawing a single bankbook or the like upon request from a host computer or a customer. For example, the apparatus for recording items in a bankbook, disclosed in JP-A-57-31092, is constructed of a stacker for stacking bankbooks, a hopper for drawing out a bankbook therefrom, a magnetic stripe reading mechanism, and a page/line detecting and page turning mechanism, thus improving the efficiency of dealing with bankbooks during bank service.

However, to improve the efficiency in management of bankbooks or documents (hereinafter collectively called bankbook throughout this specification) during bank service, it has long been desired to develop a bankbook issuing apparatus which can reserve plural types of bankbooks and manage to pick up a necessary bankbook or to record items in the bankbook upon request from a customer.

SUMMARY OF THE INVENTION

It is an object of the present invention to eliminate the above-described prior art problem and to provide a bankbook issuing apparatus which can reserve plural types of bankbooks on a shelf, and automatically draw a bankbook which a customer or a center requests so that complicated manual work can be replaced with mechanical work and hence improve the efficiency of work.

According to the present invention, a bankbook issuing apparatus is provided which comprises: a plurality of bankbook store units each reserving stacked bankbooks therein, the store units being disposed along a transport path extending to a bankbook outlet; means for selecting one of the store units and drawing one of the bankbooks stacked in the selected store unit; and means for transporting the drawn-out bankbook to the bankbook outlet along the transport path.

According to one aspect of the present invention achieving the above object, the bankbook issuing apparatus having a plurality of bankbook store units comprises a bankbook drawing section which includes: an opening formed in each of the bankbook store unit at the lower portion thereof for drawing out a bankbook; a transport means mounted in association with the drawing-out opening and capable of rotating both in forward and reverse directions; and a guide mounted at the drawing-out opening for preventing a bankbook from being drawn in the bankbook store unit; wherein the bankbook drawing section is constructed such that after rotating the transport means in one direction to draw a bankbook via the drawing-out opening, the transport means is rotated in the reverse direction to pass the drawn-out bankbook through the lower portion of the drawn-out opening in cooperative association with the bankbook drawing-in preventing guide and transport the bankbook further to an issue processing section.

With the above construction, different means are provided, one for performing a separation function of separating a bankbook from the remaining ones in the store unit while drawing out the bankbook and the other for performing a trahsport function after separation. Further, the bankbook drawing-in preventing guide is mounted in the bankbook drawing section. Thus, the object to transport a desired bankbook without influencing the remaining other reserved bankbooks can be achieved.

According to another aspect of the present invention, there is provided a bankbook issuing apparatus wherein store units each for separately stacking and reserving bankbooks of a same type among several different types and stopper mechanisms for stopping transforming a bankbook drawn from the store unit, are disposed one after another along the transport path of a drawing-out mechanism; only the stopper mechanism belonging to the store unit in which a bankbook to be issued is stacked, is released; and the bankbook is separated from the remaining ones in the store unit to draw it onto the transport path and pass it under the preceding store unit by using a feed roller.

With the above construction, the drawing-out mechanism is made small in dimension by disposing store units, in which bankbooks are stacked, one after another along a tansport path. Specifically, consider now a bankbook issuing apparatus wherein bankbooks of different types are reserved in the store units on a shelf in such a way that bankbooks of a same type only are stored in a single store unit. When a bankbook in a store unit at the back stage is to be issued, it is necessary to transport the bankbook by passing it under the preceding store units. However, feed rollers at the preceding store units become an obstacle in transporting the bankbook. In view of this, in this invention, the feed rollers are used as transport rollers so that bankbooks of different types can be disposed laterally along the transport path.

DESCRIPTION OF THE PREFERRED EMBODIMENTS

A first embodiment of the present invention will be described with reference to the accompanying drawings.

Figure 1:
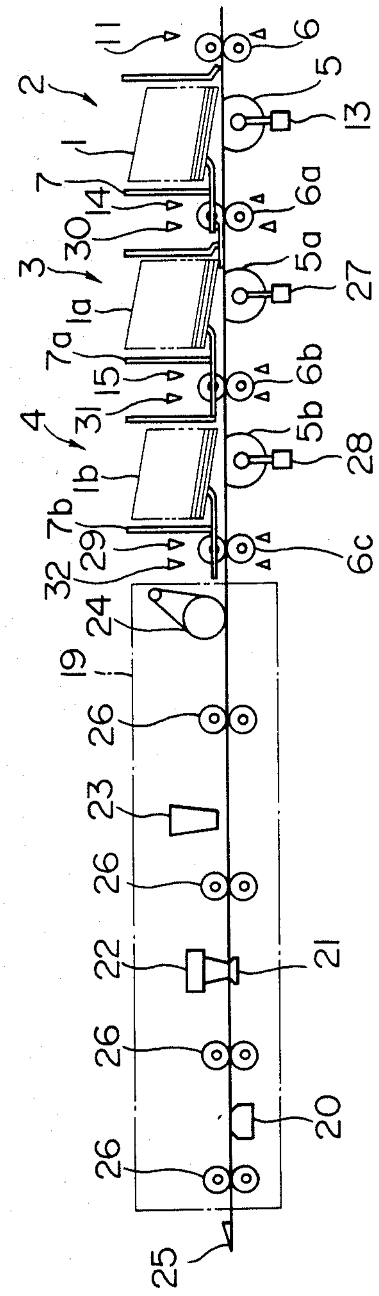
FIG. 1 is a side view schematically illustrating an embodiment of the bankbook issuing apparatus according to the present invention.
Figure 2:
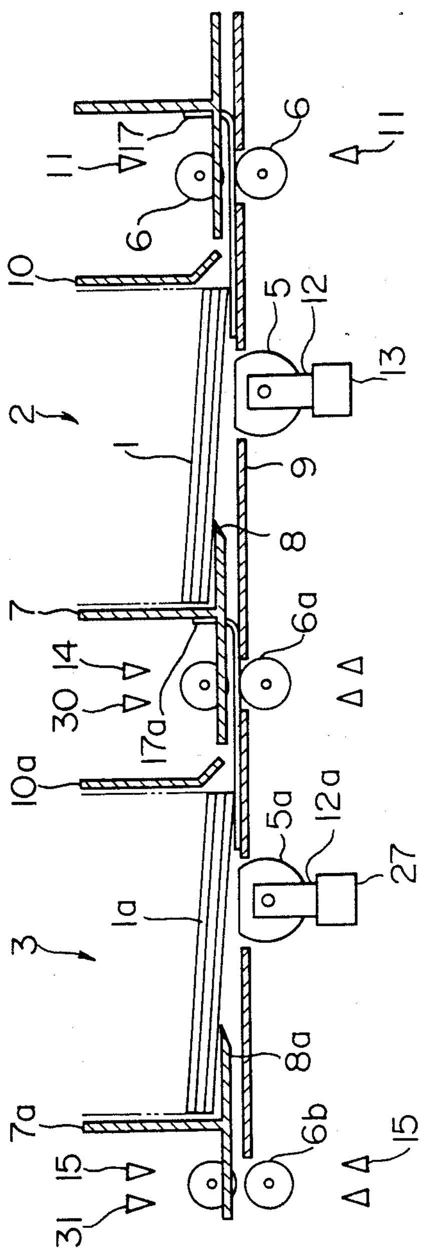
FIG. 2 is a cross-sectional side view showing the main portion of the apparatus of FIG. 1.
Figure 3:
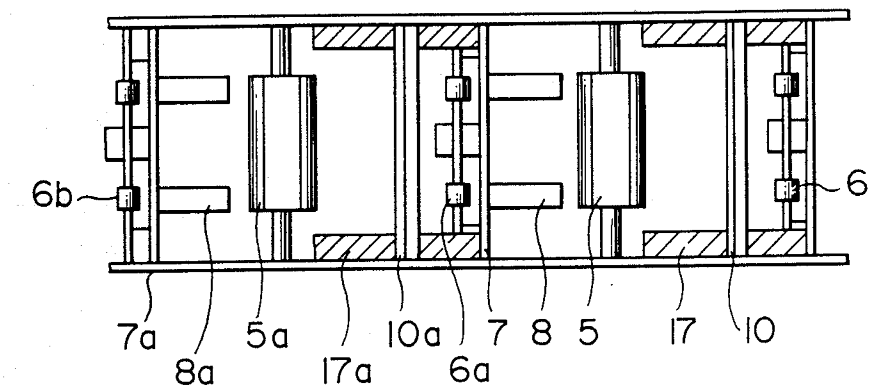
FIG. 3 is a top view of FIG. 2.

Referring now to FIGS. 1 to 3, reference numerals 1, 1*a* and 1*b* each represent bankbooks of different types reserved in respective bankbook store units (hopper) to be described later, reference numerals 2, 3 and 4 represent third, second and first store units for reserving bankbooks 1, 1*a* and 1*b*, reference numerals 5, 5*a* and 5*b* represent feed rollers, and reference numerals 6, 6*a* and 6*b* represent transport roller pairs. The feed rollers 5, 5*a* and 5*b* are respectively driven by independent motors which can rotate both in the forward and backward directions, while the transport roller pairs 6, 6*a* and 6*b* are driven all together by a single motor which can rotate both in the forward and backward directions.

Reference numerals 7, 7*a* and 7*b* represent bankbook supports mounted as having a space between the bottom of the support and a transport surface 9 to be described later, the space being slightly greater than the thickness of a bankbook so as to enable passing a selected bankbook therethrough. One end of each of the bankbook supports 7, 7*a* and 7*b* is formed as tip portions 8, 8*a* and 8*b* including slanted portions each for serving as a guide for transporting a bankbook. The bankbook supports 7, 7*a*, 7*b* as well as guide plates 10, 10*a* and 10*b* respectively constitute the store units (hopper).

A transport surface 9 serves as a reference in operation of the apparatus. The guide plates 10, 10*a* each form a part of a drawing-out opening while drawing out a bankbook. Transport guides 17, 17*a* and 17*b* each of substantially L-shape and having a rising portion on the side facing a corresponding one of the bankbook supports 7, 7*a* and 7*b*, are positioned above the transport surface 9. The transport guides 17, 17*a* and 17*b* each made of a flexible material such as Myler support one end of the bankbook 1, 1*a* or 1*b* stacked in the store unit (hopper) 2, 3 or 4 to serve as a separating guide while drawing out a bankbook, as described later. As shown in FIG. 3, a bankbook can be reliably transported by mounting respective pairs of transport guides 17, 17*a* and 17*b* on both sides of and above the transport surface.

Reference numerals 11 to 15 and 27 to 32 represent optical sensors (hereinafter referred to as "sensor"), reference numeral 18 designates a bankbook being drawn, and reference numeral 19 represents a printer unit which is constructed of a magnetic head 20, platen 21, printing head 22, optical sensor 23, page turning roller 24, bankbook outlet/inlet 25, transport roller 26 and so forth. The function of the optical sensor will be described later where appropriate.

The operation of the embodiment of the apparatus constructed as above and shown in FIG. 1 will be described.

Bankbooks 1, 1*a* and 1*b* of three different types are reserved (set) on a shelf comprised of the first, second and third store units. In the following description, the operation of issuing a bankbook 1 from the third store unit 2 will be given in connection with FIGS. 4 to 10.

Figure 4:
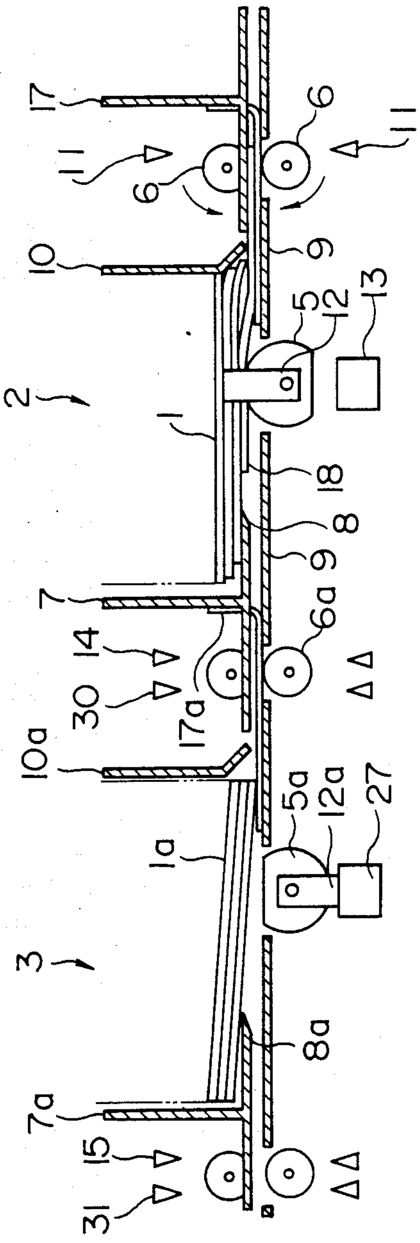
FIGS. 4, 5, 6, 7, 8, 9 and 10 are cross-sectional views for explaining the operation of the apparatus of FIG. 1.

First, as shown in FIG. 4, feed rollers 5 are rotated in the clockwise direction to move frictionally a selected bankbook 18 at the lowest position in the store unit to the gate formed between the end portion of the guide plate 10 and the transport surface 9, and displace it to the right (remote from the bankbook outlet). The displaced bankbook 18 is further transported to the right by the transport roller pair 6 until it is detected by a sensor 11 whereat the end of the bankbook separates from the bankbook support 7 and the transport roller pair 6 is stopped. At this time, the operation of drawing (separating) the selected bankbook 18 is completed.

Figure 5:
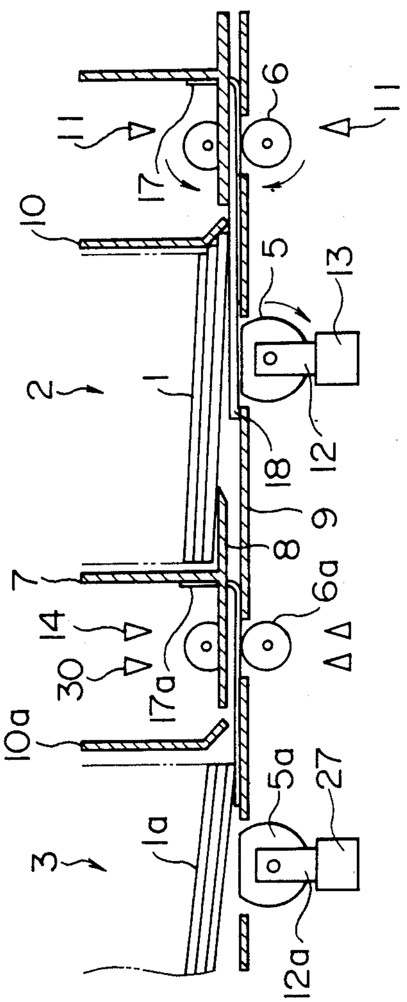

Next, as shown in FIG. 5, the sensor 13 is shielded with a feed roller sensor shield plate 12 so as to ensure that the flat portion of the feed roller 5 does not extend above the transport surface 9.

Figure 6:
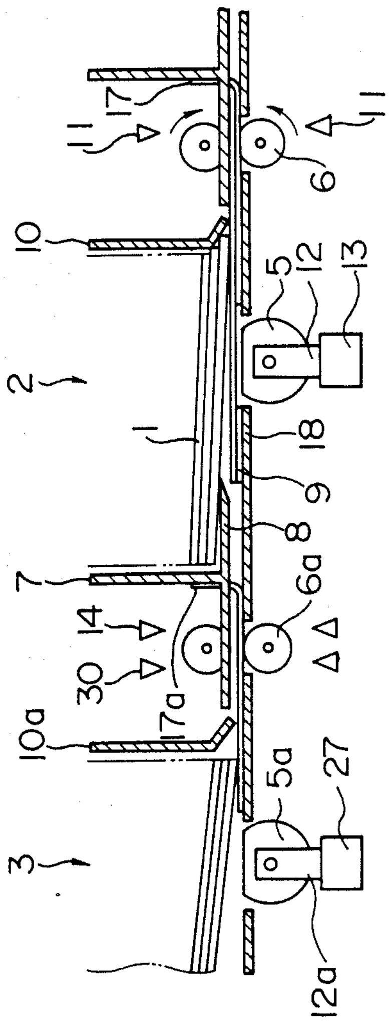
Figure 7:
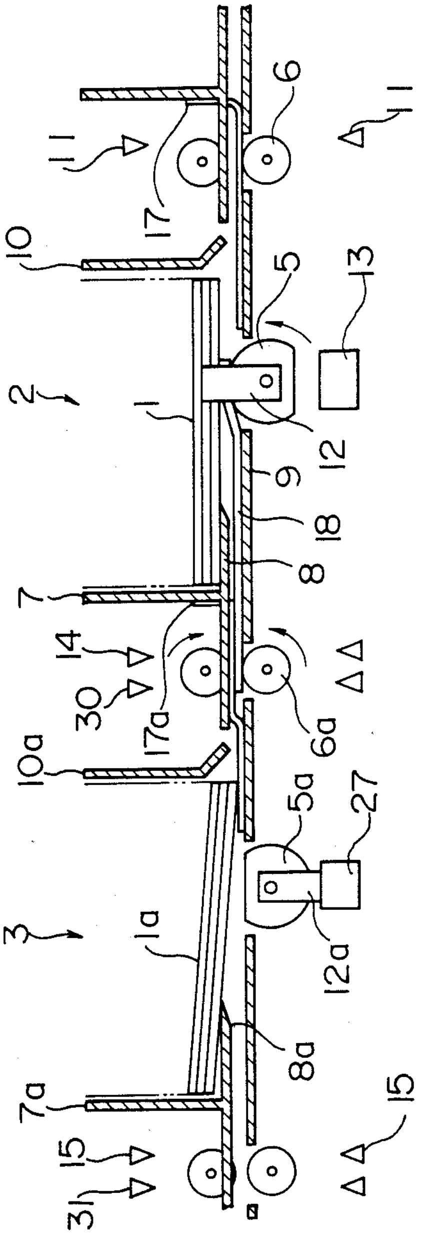

After the feed roller 5 is stopped as previously described, the transport roller pair 6 is rotated this time in the forward direction. As shown in FIG. 6, the bankbook 18 is then transported in the direction (to the left as seen in the Figure) from the tip portion 8 of the bankbook support 7 toward the bankbook outlet. In this case, the tip portion of the bankbook support 8 guides the selected bankbook 18 so that it passes through an air gap formed between the bankbook support 8 and the transport surface 9 without entering into the store unit 2. Thereafter, as shown in FIG. 7, the feed roller 5 is rotated counter-clockwise to further transport the bankbook 18 away from the third store unit 2 so that the bankbook 18 is then transported by the transport roller pair 6*a*.

Figure 8:
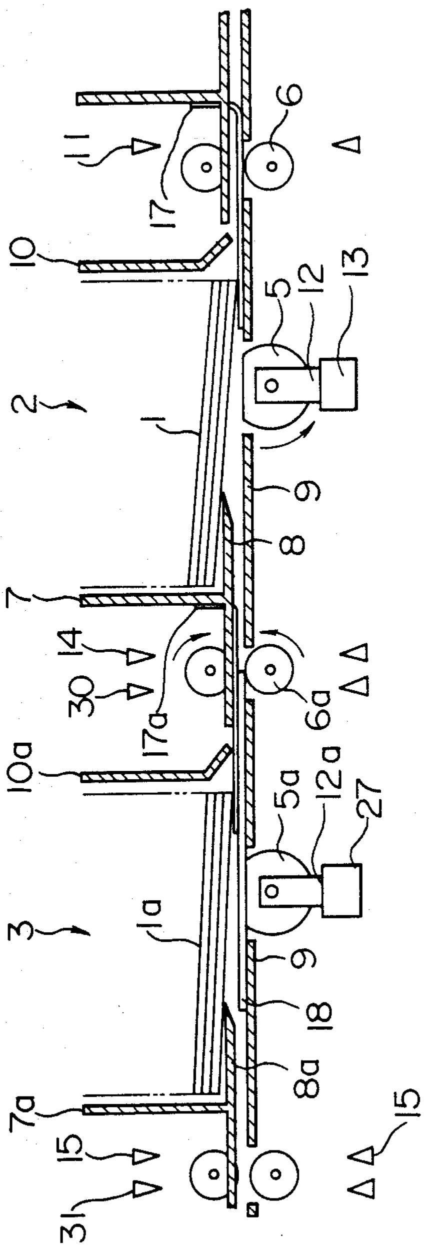

The transport roller pair 6*a* transports the bankbook 18 under the second store unit 3 with the help of the transport guide 17*a*. In this case, as shown in FIG. 8, the bankbook 18 moves while the flexible transport guide 17*a* together with the bankbooks 1*a* stacked thereon is pushed up by the bankbook 18, thus avoiding any contact between the bankbook 18 and the bankbook 1*a* and also preventing the bankbook 18 from being introduced within the second store unit 3. Transporting the bankbook 18 to the second store unit 3 by the transport pair 6*a* is similar to the drawing-out operation from the third store unit 2. Thus, the bankbook 18 is transported forward, i.e., in the direction (to the left as seen in the Figure) from the tip portion 8*a* of the bankbook support toward the bankbook outlet.

Figure 9:
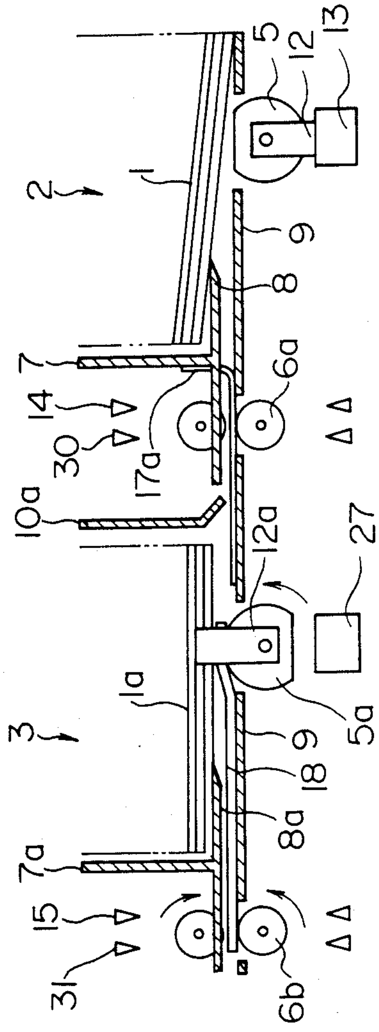
Figure 10:
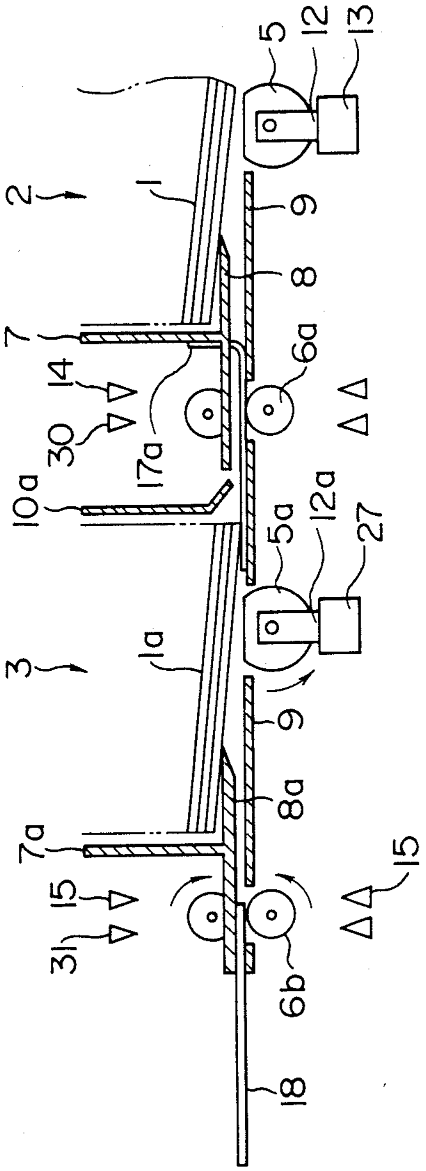

After the sensor 14 detects the bankbook 18, the feed roller 5*a* is rotated in the forward direction as shown in FIG. 9 to transport the bankbook 18 so as to pass under the second store unit 3. After the bankbook 18 passes the second store unit 3, the sensor 31 is shielded to stop the feed roller 5*a* as shown in FIG. 10. Then, the bankbook 18 is further transported so as to pass under the first store unit 4 by means of the transport roller pair 6*b*.

For the first store unit 4, the selected bankbook 18 is transported in the similar procedure to that of the second store unit 3. Each store unit 2, 3 or 4 takes an initial state as shown in FIG. 2 after the bankbook 18 passes it.

Reverting now back to FIG. 1, the bankbook 18 passed through the first store unit 4 reaches the printer unit 19. While the bankbook 18 is transported to the left as seen in the Figure (in the direction toward the bankbook outlet) within the printer unit 19 by a plurality of transport roller pairs 26, it is subjected to magnetic stripe reading or writing with the magnetic head 20 and subjected to printing of necessary information with the platen 21 and the printing head 22. In addition, a bar code representative of an item, page and the like of the bankbook is read with the optical sensor 23, and if the item, page and the like differ from those instructed by the host computer or the customer, then pages are turned over by the page turning roller 24. The bankbook 18 is thereafter issued ejecting out of the bankbook outlet (also serving as bankbook inlet).

Figure 11:
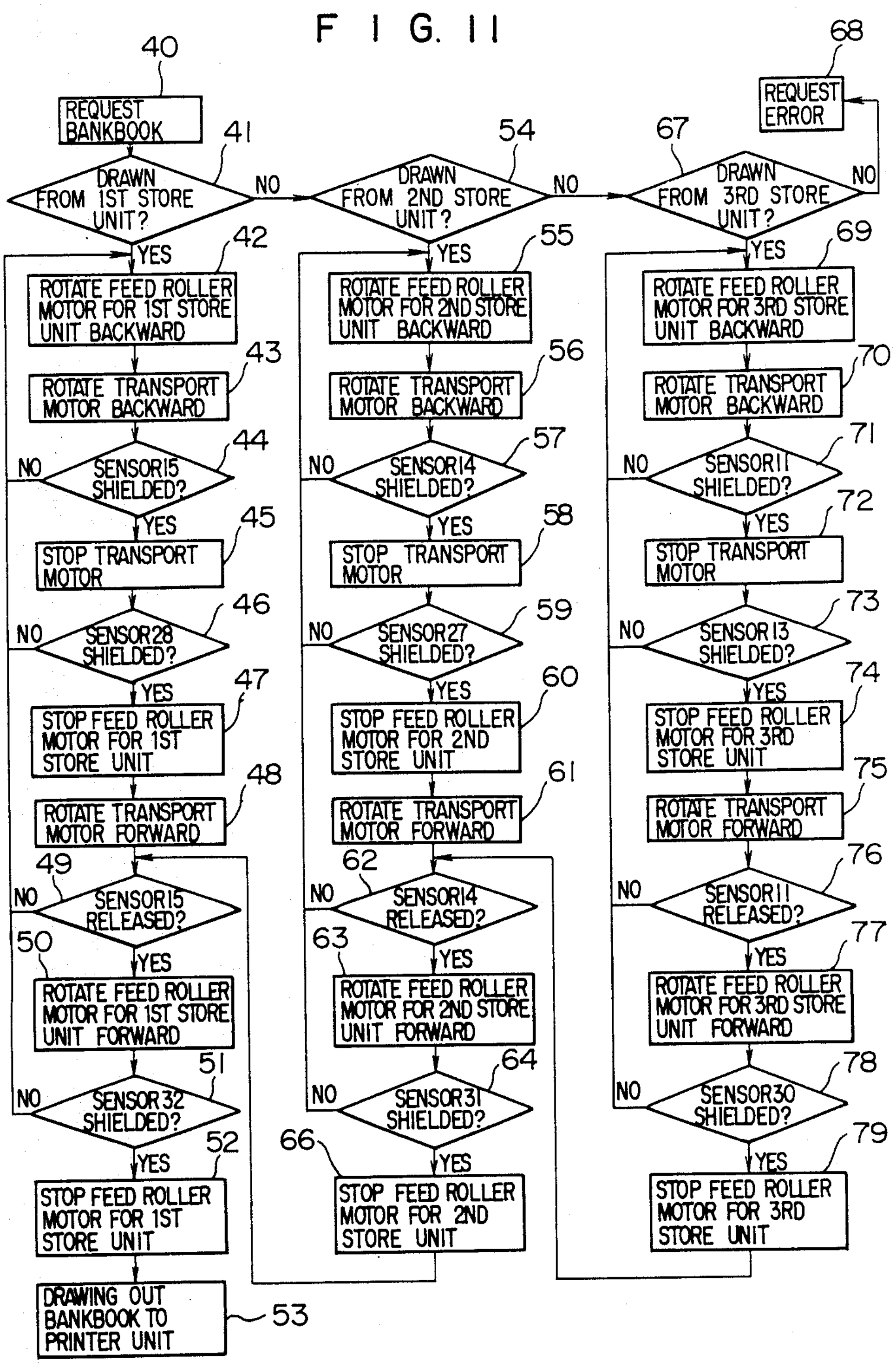
FIG. 11 is a flow chart illustrating the control operation by motors mounted in the apparatus.

The operation of transforming a bankbook to the bankbook outlet 25 will be described referring to the flow chart of FIG. 11.

In the Figure, assuming that a request for drawing out a bankbook from the third store unit 2 is effected at step 40, then step 67 is selected. At step 69, the feed roller 5 of the third store unit 2 is rotated in the reverse direction (clockwise) to draw a bankbook 18 located at the lowest of the third store unit 2 in the direction away from the bankbook outlet 25. Next at step 70, the transport roller pair 6 is also rotated to help the bankbook 18 to be transported. When the sensor 11 of FIG. 4 is shielded at step 71 during the transport of the bankbook 18, step 72 follows whereat the motor for the transport roller pair is stopped. When the sensor shielding plate 12 shields the sensor 13 during rotation of the feed roller 5 in the reverse direction, then the feed roller 5 is stopped fully at step 73. At this time, the flat portion formed on the part of the feed roller 5 is directed upward and does not contact the bankbook being transported. Next at step 75 the transport roller pair 6 is rotated in the forward direction (counter-clockwise) to transport the bankbook toward the bankbook outlet 25. While transporting the bankbook 18, when the sensor (FIG. 6) is released at step 76, then step 78 follows to rotate the feed roller 5 in the forward direction and transport the bankbook 18 toward the second store unit. After the bankbook 18 passes the transport roller pair 6*a*, the sensor 14 is released (step 62). Therefore, the feed roller 5*a* of the second store unit 3 starts rotating in the forward direction. The bankbook 18 being transported by the feed roller 5*a* with the help of the transport roller pair 6*a* shields the sensor (step 64). Then, the feed roller 5*b* is stopped (step 66). The bankbook 18 is further transported by the transport roller pair 6*b*, and when the sensor 15 is released (step 49), the feed roller 5*b* for the first store unit 4 is rotated in the forward direction (step 50). The bankbook 18 is then transported by the feed roller 5*b* with the help of the transport roller pair 6*c* toward the bankbook outlet 51 until the sensor 31 is shielded (step 51). Thereafter, the bankbook 18 is conveyed by the transport roller pair 6*b* to the printer unit 19 shown in FIG. 1 and picked up at the bankbook outlet 25.

The case where a bankbook is drawn from the first or second store unit is identical with the above operation, so the description therefor is omitted.

Although not particularly described with the above embodiment, the feed roller 5, 5*a* and 5*b* each separate the bankbook at the lowest position in the selected store unit with the help of friction between the roller and the bankbook. Thus, it is very important to pay attention to its material and configuration. Particularly, the flat portion formed on each feed roller is provided so as not to hinder the passage of a bankbook by directing the flat portion upward at the stop position. Further, it is necessary also to pay attention to the flexibility and surface smoothness of the transport guides 17, 17*a* and 17*b*.

In the above embodiment, the apparatus is provided with three store units for reserving bankbook of three different types. However, the number of store units is not limited thereto, but obviously the number may be increased as occasion demands. Further, the arrangement (disposal) of store units is not limited to a horizontal one, but a slanted or curved one or combination thereof may be used. Furthermore, the present invention is not limited to be used with a bankbook, but it is obvious the invention can be applied to a single sheet such as a document.

As described so far, according to the first embodiment of the present invention, bankbooks and the like of different types can be reserved and managed using a single apparatus. Therefore, not only the reservation and management of bankbooks and the like can be achieved easily at financial institutions, but also bankbooks and the like can be automatically drawn out from the apparatus interconnected to a central processing apparatus, in accordance with the command therefrom, thus enjoying distinctive effects of the present invention.

Figure 12:
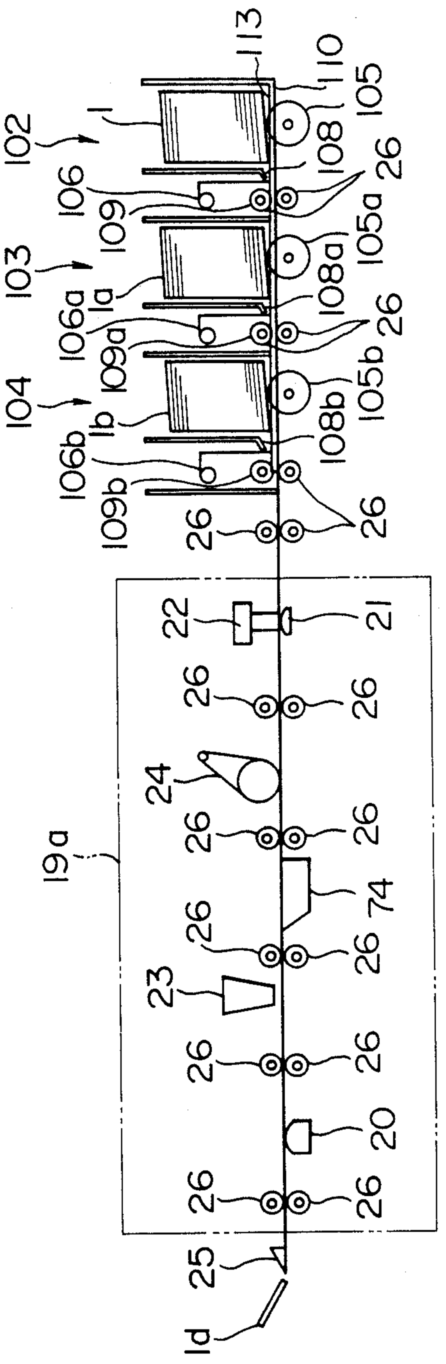
FIG. 12 is a side view schematically showing another embodiment of the bankbook issuing apparatus according to the present invention.

Next the second embodiment of the present invention will be described in detail with reference to the accompanying drawings. FIG. 12 shows the construction of the second embodiment of the bankbook issuing apparatus according to the present invention. In the Figure, reference numerals 104, 103 and 102 represent first, second and third store units laterally arranged in this order starting from the front side (i.e., bankbook outlet side). Reference numeral 22 represents a printing head mounted on a transport path 110 for printing characters in a bankbook or the like. Reference numeral 24 represents a page turning mechanism for turning pages of a bankbook or the like, reference numeral 23 represents an optical reader for confirming if the bankbook or the like has been turned to the desired page or not, and reference numeral 20 is a magnetic stripe mechanism for recording and reproducing necessary information respectively in and from a magnetic stripe. Reference numeral 74 represents a collection box mounted on the transport path 110 for collecting bankbooks or the like which have been inserted from a bankbook inlet/outlet 25 and as to which a decision has been made to discard them. Reference numerals 106, 106*a* and 106*b* represent stoppers, reference numerals 105, 105*a* and 105*b* represent feed rollers, and reference numeral 26 represents a transport roller pair. In FIG. 12, a printer unit 19*a* is constructed of the collection box 74, magnetic stripe mechanism 20, printing head 22, optical reader 23, page turning mechanism and transport roller pairs 26.

When the customer inserts a bankbook 1*d* into the bankbook inlet/outlet 25 of the apparatus of this invention applied, for example, to a bankbook recording apparatus, necessary items are recorded in the bankbook 1*d* which in turn is ejected out from the bankbook outlet 25. Also, in case of issuing a new bankbook, or in case of issuing a document such as an account or receipt, a bankbook or the like is picked up from one of the store units 104, 103 and 102 upon request from a host computer or a customer and transported via the transport path 110 to issue it from the bankbook outlet 25.

Now assuming that bankbooks 1*b*, 1*a* and 1 are set in the store units 104, 103 and 102. In this condition, if a customer, who has opened a business account with another using a bankbook, inserts it into the bankbook inlet/outlet 25, the bankbook 1*d* is collected into the collection box 74 provided it is considered to be a brought-forward account. If it is necessary to issue a new bankbook because the account columns to be recorded have been wholly used or because of some other reasons, a new bankbook 1 which has been set in the third store unit 102 is drawn out and transported onto the transport path 110.

Figure 13:
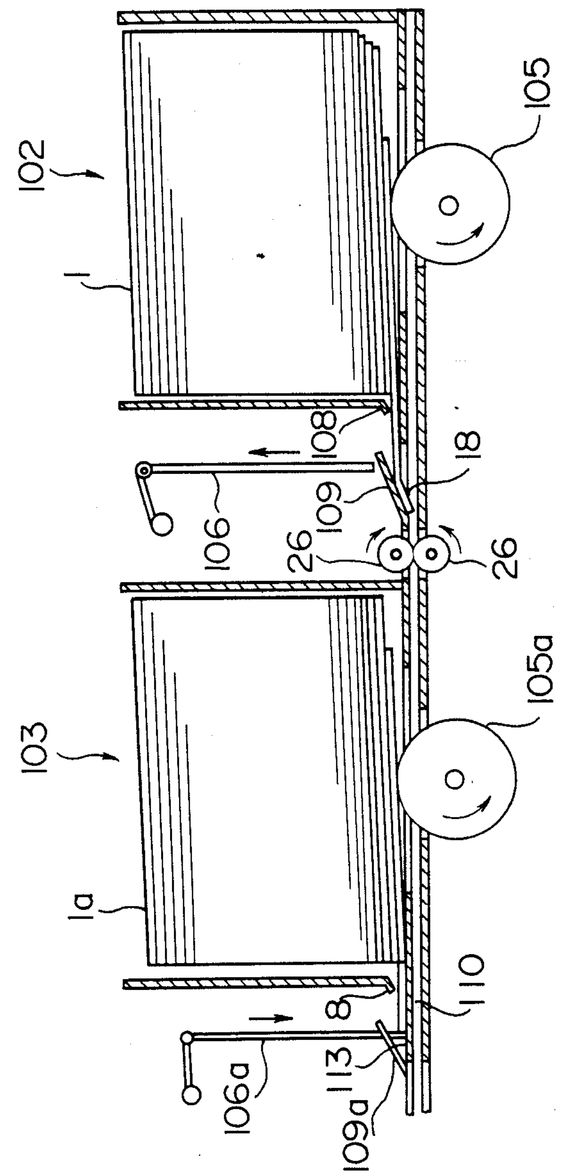
FIG. 13 is a cross-sectional side view showing the drawing-out mechanism of FIG. 12.

As shown in FIG. 13, to issue a new bankbook 1, first the stopper 106 is moved upward while maintaining the stoppers 106*a* and 106*b* at the lower position to permit the bankbook 1 in the third store unit 102 to be transported from the gate 108 toward the transport path 110. Thereafter, the feed roller 105 is rotated to draw out the bankbook 1 at the lowest position the counterclockwise direction and move it toward the gate 108. The bankbook 1 at the lowest position in the third store unit 102 is then separated and drawn as a bankbook 18 at the gate 108. The separated bankbook 18 is drawn along the transport path 109 and moved onto the transport path 110. The bankbook 18 is further transported between the feed roller 105*a* under the second store unit 103 and the upper frame 113 by means of the transport roller pair 26.

Figure 14:
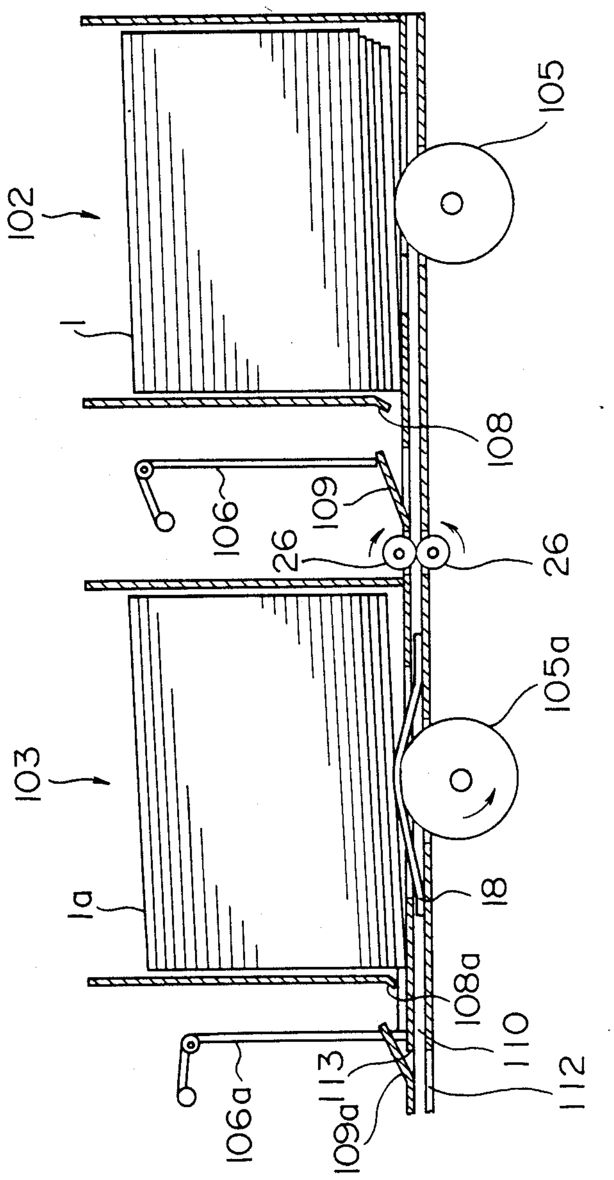
FIG. 14 is a cross-sectional side view showing the transport mechanism of FIG. 12.
Figure 15:
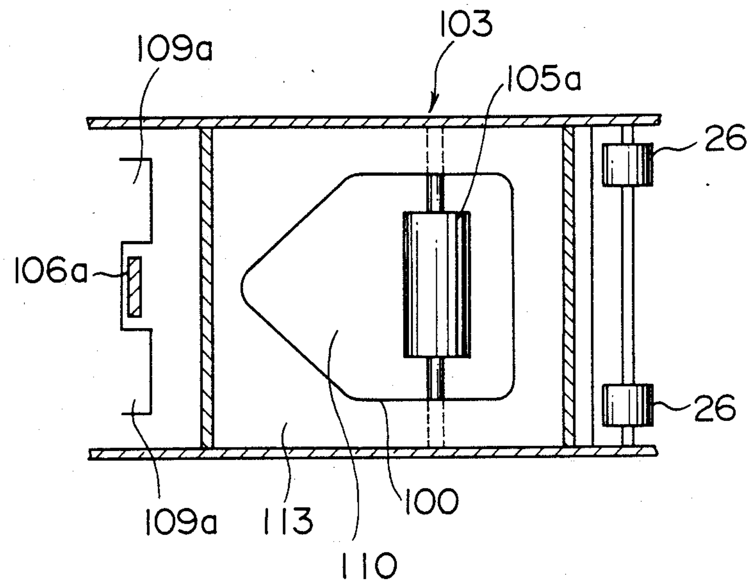
FIG. 15 is a top view showing briefly the transport mechanism of FIG. 14.

Next, as shown in FIG. 14, the transported bankbook 18 is pushed against the feed roller 105*a* by the weight of the upper frame 113 and the bankbooks 1*a* so that the bankbook 18 in frictional contact with the feed roller 105*a* is further transported in the direction of roration of the feed roller 105*a*. In this case, the top view of the second store unit 103 is as shown in FIG. 15. The bankbook 18 (not shown) transported by the feed roller 105*a* is inserted between the transport path 110 and the upper frame 113 while being curved by an opening generally of pentagon shape. The bankbook 18 passes below the first store unit 104 in a similar manner to the second store unit 103, although this operation is not depicted in FIGS. 14 and 15.

Figure 16:
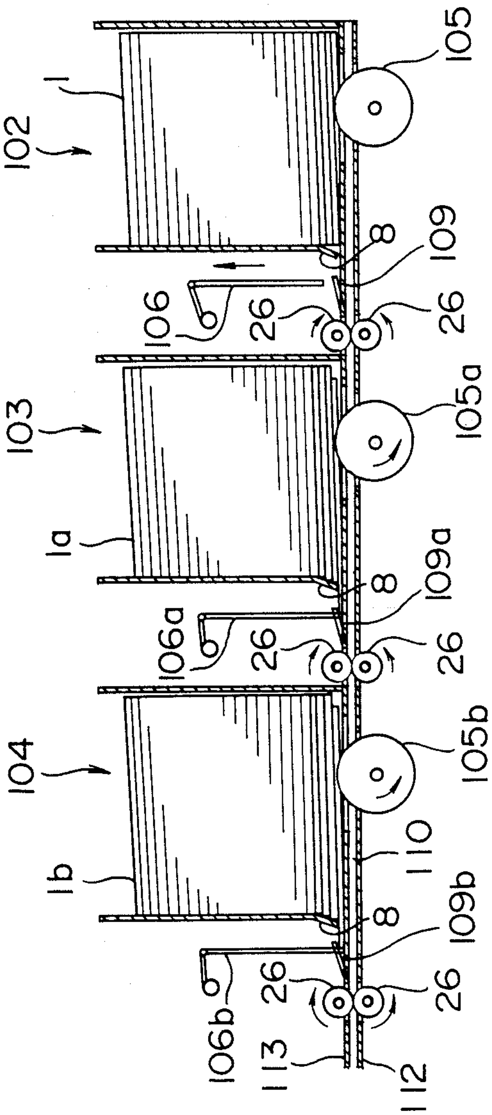
FIG. 16 is a cross-sectional side view of the stopper mechanism of FIG. 12.

In this case, the operation condition between the first, second and third store units 104, 103 and 102 and the transport path 110 becomes as shown in FIG. 16. Specifically, the stoppers 106*b* and 106*a* of the first and second store units 104 and 103 have their hinges moved downward to contact the upper frame 113 so that the bankbooks 1*b* and 1*a* are not drawn out form the respective store units 104 and 103. Thus, the bankbooks 1*b* and 1*a* at the lowest positions in the first and second store units 104 and 103 are still kept at the positions of the stoppers 106*b* and 106*a*.

In other cases, for example, in case of drawing out a bankbook 1 from the first store unit 104, the stoppers 106*a* and 106 are maintained at lower positions and the feed rollers 105*a* and 105 for the second and third store units 103 and 102 are not rotated.

As shown in FIG. 12, a bankbook 1 is drawn out from the third store unit 102 and passed through the second and first store units 103 and 104. Then, it is transported to the page turning mechanism 24 by the transport roller pairs 26 whereat a page turning operations is carried out. The bankbook 1 is then transported to the optical reader 23 by the transport roller pair 26 whereat the bar code is read to confirm if the desired page has been turned over. Further, after transporting to the magnetic stripe mechanism 20 by the transport roller pair 26, information necessary for the magnetic stripe is written in or read out. Still further, the bankbook 1 is transported backward by the transport roller pair 26 and stopped at between the platen 21 and the printing head 22 whereat necessary items are printed. Again the bankbook 1 is transported in its positive transporting direction by the same transport roller pair 26 to eject it from the bankbook outlet 25. Thus, the process of issuing a bankbook is completed.

As described above, according to the second embodiment of the present invention, bankbooks or the like of several different types can be reserved on a single shelf, and any type of a bankbook or the like can be automatically drawn out and printed upon request from a host computer. Therefore, by adding a different type of bankbook to be reserved on the shelf, it is possible to perform a new bankbook issuing work which the operator at the bank counter has heretofore dealt with, thus advantageously improving the workability.

What is claimed is:

1. A bankbook issuing apparatus, having a plurality of bankbook store units comprising:

a bankbook drawing section including: an opening formed in each of said bankbook store units at the lower portion thereof for drawing out a bankbook; transport means mounted in correspondence with said drawing-out opening and capable of rotating both in forward and reverse directions; and a guide mounted at said drawing-out opening for preventing a bankbook from being drawn in said bankbook store unit;

wherein said bankbook drawing section is constructed such that after rotating said transport means in one direction to draw bankbook via said drawing-out opening, said transport means is rotated in the reverse direction to pass the drawn-out bankbook under said drawn-out opening in cooperative association with a bankbook drawing-in preventing guide and transport said bankbook further to an issue processing section, wherein said transport means is a plurality of feed rollers mounted on said store units, each of said store units being formed with a flat portion on said feed rollers, and wherein when said feed roller is at a stop position, said drawn-out bankbook is permitted to pass over said flat portion.

2. A bankbook issuing apparatus, comprising:

a plurality of bankbook store units mounted along a single transport path extending to a bankbook outlet each for reserving bankbooks in stacked state;

drawing-out means for selecting one of said plurality of bankbook store units and drawing out a bankbook from said selected bankbook store unit; and transport means for transporting said drawn-out bankbook along said transport path, each of said bankbook store units has an opening at the lower portion thereof for drawing out a bankbook;

said bankbook drawing-out means includes: a feed roller mounted below each of said bankbook store unit, said feed roller being capable of rotating in the forward and backward directions, and said feed roller in association with said selected bankbook store unit rotating in one of said both directions to draw a bankbook at the lowest position in said selected store unit in the direction away from said bankbook outlet; and transport guide means mounted on each store unit at the position remote from said bankbook outlet for abutting against said bankbook drawn from said selected store unit by said feed roller in association with said selected store unit and stopping the movement of said bankbook; and said transport means makes said feed roller rotate in the other of said both directions when said bankbook drawn from said selected store unit abuts against said guide means, and when said drawn-out bankbook passes under the non-selected store unit, said transport means makes said feed roller in association with said non-selected feed roller rotate in the other of said both directions to transport said drawn-out bankbook to said bankbook outlet, wherein said transport means is a plurality of feed rollers mounted on said store units, each of said store units being formed with a flat portion on said feed rollers, and wherein when said feed roller is at a stop position, said drawn-out bankbook is permitted to pass over said flat portion.

3. A booklet issuing apparatus comprising:

a single transport path for transporting a booklet to be issued as a bankbook along the transport path;

a plurality of booklet store units, each thereof for accommodating stacked booklets therein, and having an opening at a bottom portion thereof for drawing out a booklet, said booklet store units being juxtaposed along said transport path so that said openings facing said transport path; and rollers disposed on said transport path at positions under the openings of the booklet store units, respectively, each of said rollers being rotatable to draw out a lowermost one of the stacked booklets in the associated booklet store unit, the lowermost booklet drawn-out from each of the booklet store units being transported toward a front end of the transport path, the roller positioned on the front side of said drawn-out booklet having a recess portion on a periphery thereof to allow said drawn-out booklet to pass through, said roller on the front side receiving the drawn-out booklet in a state that the recess portion faces the associated opening, and thereafter said drawn-out booklet being transported toward the front end of the transport path by rotating said roller on the front side.

4. A bankbook issuing apparatus, comprising a plurality of bankbook store units mounted along a single transport path extending to a bankbook outlet each for reserving bankbooks in stacked state, wherein said bankbook store units are constructed to separate, stack and reserve bankbooks of a same type among several different types, drawing-out means for selecting one of said plurality of bankbook store units and drawing out a bankbook from said selected bankbook store unit, wherein said drawing out means includes feed rollers associated with respective bankbook store units and rotatable from a position below the single transport path to a position above the single tranport path adjacent the respective bankbook outlets so that a surface of the feed rollers draws out a bankbook on a plane substantially coincident with said transport path; and transport means for transporting said drawn-out bankbook along said transport path.

* * * * *